United States Patent [19]
Oishi et al.

[11] 3,908,781
[45] Sept. 30, 1975

[54] VEHICLE IMPACT ABSORBING BUMPER DEVICE WITH COLLISION DETECTOR

[75] Inventors: Kazuo Oishi, Oobu; Takashi Yamada, Anjo; Takeshi Matsui, Kariya, all of Japan

[73] Assignees: Nippon Soken, Inc., Nishio; Toyota Jidosha Kogyo Kabushiki Kaisha, Toyota, both of Japan

[22] Filed: Oct. 25, 1973

[21] Appl. No.: 409,456

[30] Foreign Application Priority Data
Nov. 24, 1972 Japan.............................. 47-118356

[52] U.S. Cl............. 180/91; 180/103; 280/150 AB
[51] Int. Cl.².......................................... B60R 21/02
[58] Field of Search........ 180/91, 103; 280/150 AB; 324/174, 179; 73/517 R

[56] References Cited
UNITED STATES PATENTS

| | | | |
|---|---|---|---|
| 2,978,599 | 4/1961 | Wilcox................................. | 324/174 |
| 3,243,692 | 3/1966 | Heissmeier...................... | 324/174 X |
| 3,252,024 | 5/1966 | Louden............................... | 324/174 |
| 3,421,080 | 1/1969 | Lightcap............................ | 324/179 |
| 3,703,300 | 11/1972 | Gillund............................. | 280/150 AB |
| 3,792,874 | 2/1974 | Ayres............................. | 280/150 AB |
| 3,794,136 | 2/1974 | Okada...................... | 280/150 AB X |
| 3,830,329 | 8/1974 | Sumida...................... | 280/150 AB X |

FOREIGN PATENTS OR APPLICATIONS
933,173   9/1955   Germany............................ 324/174

OTHER PUBLICATIONS

Goretzki, IBM Tech. Disclosure, Vol. 13, No. 9, 2/1971, pp. 2579 Mazzeo, "Instruments & Control Systems," Vol. 39, No. 6, 6/1966, pp. 125-126.

*Primary Examiner*—David Schonberg
*Assistant Examiner*—Terrance L. Siemans
*Attorney, Agent, or Firm*—Cushman, Darby & Cushman

[57] ABSTRACT

There is provided a vehicle impact absorbing bumper device equipped with a collision detector which comprises a bumper device for absorbing, during the collision of a vehicle, the striking energy of the collision, and a collision detector formed integral with the bumper device and adapted so that when a heavy collision occurs producing a striking energy so large that the bumper device cannot absorb it alone, an actuation signal is generated in a device for protecting the occupants of the vehicle. The collision detector comprises a generating means disposed within the bumper cylinder and composed of a stator providing a magnetic path and a generating winding for generating a voltage in accordance with the variation of magnetic reluctance of the magnetic path, and alternate projections and notches composed of a magnetic material and formed on the piston of the bumper device to change the magnetic reluctance of the magnetic path.

4 Claims, 8 Drawing Figures

VEHICLE IMPACT ABSORBING BUMPER DEVICE WITH COLLISION DETECTOR

BACKGROUND OF THE INVENTION

1. Field of the Invention

The present invention relates to a novel vehicle impact absorbing bumper device with a collision detector comprising a bumper device for absorbing, during the collision of a vehicle, the striking energy of the collision, and a collision detector formed integral with the bumper device and adapted so that when an occupant protective device such as an air bag or a seat belt is used to protect the occupants of the vehicle during a heavy collision against the striking energy that cannot be absorbed by the bumper device alone, an actuation signal is generated to inflate the air bag or lock the seat belt.

2. Description of the Prior Art

In known vehicle impact absorbing bumper devices having a collision detector, the impact absorbing bumper device and the collision detector are separated from each other. For example, a gravity sensor for detecting a collision is attached to a portion of the vehicle different from the position of the bumper device. There are thus disadvantages of increased manufacturing steps, the time delay in the detection of a collision due to the fact that the bumper device and the collision detector are not provided at the same position, and an increased manufacturing cost of the device as a whole due to the increased manufacturing steps.

With a view to overcoming the foregoing difficulty, it is the object of the present invention to provide a vehicle impact absorbing bumper device with a collision detector wherein a collision detector for detecting the relative speed of the bumper of the impact absorbing bumper device with respect to the vehicle body during a collision of the vehicle is formed integral with the impact absorbing bumper device whereby the output voltage of the collision detector is utilized as an actuation signal for an occupant protective device to further enable the bumper device for absorbing the impact of collision at low speeds to generate the required signal for actuating the occupant protective device, and which is thus simple in construction and inexpensive to manufacture.

The device according to the present invention has among its remarkable advantages the fact that owing to the collision detector formed integral with the impact absorbing bumper device, the impact absorbing bumper device can not only perform its inherent impact absorbing function, but also act as the collision detector which, upon occurrence of a collision, makes a decision as to whether the occupant protective device should also be operated and that these two kinds of functions can be accomplished with a very simple and inexpensive construction.

Another remarkable advantage is the fact that owing to the collision detector formed integral with the bumper device to constitute the bumper device itself, the device has a very quick response characteristic and therefore the device readily satisfies the requirements that the occupant protective device be actuated as soon as an impact occurs.

DESCRIPTION OF THE PREFERRED EMBODIMENT

Figure 1:
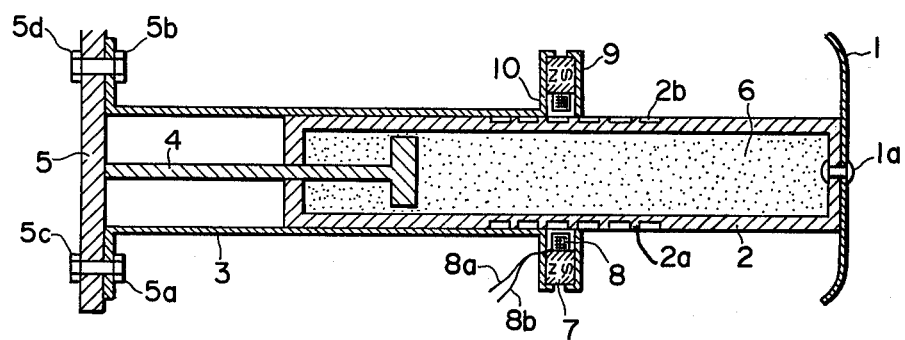
FIG. 1 is a sectional view showing an embodiment of an impact absorbing bumper device with a collision detector according to the present invention.

Referring first to FIG. 1 showing a sectional view of an embodiment of an impact absorbing bumper device equipped with a collision detector according to the present invention, numeral 1 designates a bumper, 2 a first piston for absorbing impact which is attached to the bumper 1 by an attaching rivet 1a and which is formed on the central outer surface of its magnetic material with tooth-like projections 2a providing alternate projections and notches each thereof being filled with a shaped nonmagnetic material 2b. Numeral 3 designates an impact absorbing cylinder, 4 a second piston for increasing the internal pressure of the piston 2, 5 a mounting stay on the vehicle body which is located opposite to the bumper 1 and to which the cylinder 3 is attached with locking bolts 5a and 5b and lock nuts 5c and 5d. Numeral 6 designates an impact absorbing medium contained within the first piston 2, 7 a permanent magnet, 8 a generating winding for generating a voltage across its terminals 8a and 8b. Numeral 9 designates a first stator section of a stator which provides the magnetic path of the permanent magnet 7, the first stator section 9 constituting one pole on the side of the south pole of the permanent magnet 7 and opposing on the circumference of the first piston 2 to the tooth-like projections 2a of the first piston 2 which are made of a magnetic material such as iron. Numeral 10 designates a second stator section of the stator formed integral with the cylinder 3 of a magnetic material and corresponding to the north pole of the permanent magnet 7.

With the construction described above, the operation of the embodiment of FIG. 1 is as follows. When a collision occurs, the first piston 2 is moved into the cylinder 3 so that the first piston 2 and the cylinder 3 are moved relative to each other. In this case, the second piston 4 is simultaneously urged into the first piston 2 to compress the impact absorbing medium 6. In this way, the striking energy of the collision is absorbed. At the same time, an AC voltage is generated across the terminals 8a and 8b of the generating winding 8 and this AC generated voltage is proportional to the relative speed of movement of the first piston 2 with respect to the cylinder 3 and has a period corresponding to the pitch of the tooth-like projections 2a. As a result, the magnitude of the collision which can be represented by a relative velocity with respect to a colliding object can be decided by detecting the time rate of change of flux $d\phi/dt$ due to the resultant change in the magnetic reluctance, that is, the magnitude of the generated voltage or the rate of change of flux per unit time.

Figure 2:
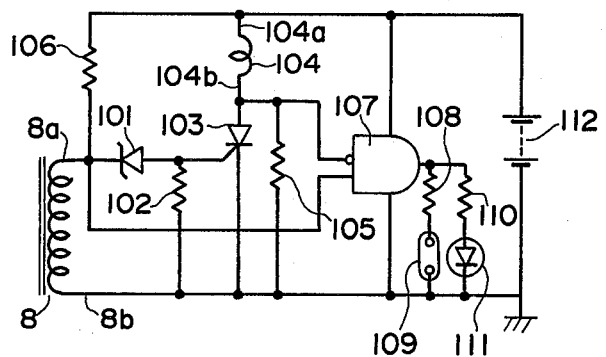
FIG. 2 is an electric wiring diagram showing an embodiment of a collision decision circuit used with the device of this invention.
Figure 4:
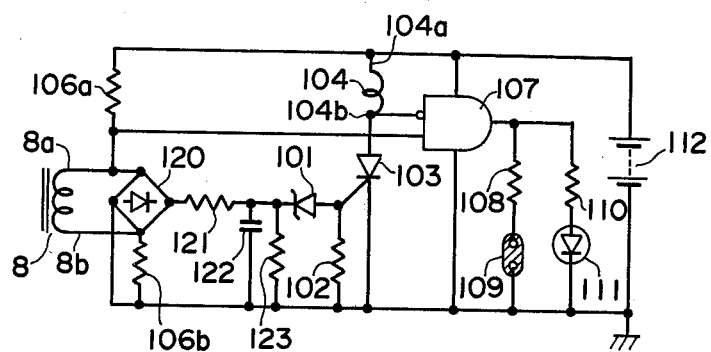
FIG. 4 is an electric wiring diagram showing a second embodiment of the collision decision circuit used with the device of this invention.

FIGS. 2 and 4 show respectively a first and second embodiment of the collision decision circuit used with the device of this invention for making the above-mentioned decision and actuating an occupant protective device. Referring first to FIG. 2, numeral 101 designates a Zener diode which determines the threshold value of the generated voltage appearing across the terminals 8a and 8b of the generating winding 8, 102 a ballast resistor for a thyristor 103, 104 a filament for igniting the detonator of an air bag, 105 a resistor utilized for detecting a fault in the filament 104, 106 a resistor utilized for detecting a fault in the generating winding 8, 107 an logical element whose one input is inverted and which produces an output corresponding to the logical product of the one input and the other input, the logical element 7 comprising in fact a NAND element having an inverter connected to one input and an inverter connected in series with the NAND element. Numeral 108 designates a current limiting resistor, 109 a fault time meter for indicating the time elapsed after the failure or breaking of the generating winding 8 or the filament 104, 110 a current limiting resistor, 111 a light emitting diode constituting a warning unit for warning the driver of the detection of the fault in the generating winding 8 or the filament 104. Numeral 112 designates a power supply battery installed in the vehicle.

Figure 3:
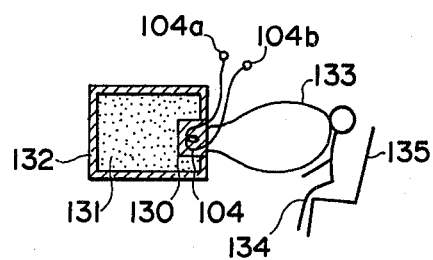
FIG. 3 is a schematic diagram showing in partial section an air bag used with the device of this invention.

FIG. 3 shows an embodiment of the air bag used with the device of this invention as an occupant protective device which is actuated by the filament 104. In FIG. 3, numeral 130 designates a detonator which is exploded by the ignition of the filament 104 connected across terminals 104a and 104b to open the valve in the passage between an air bag 133 and a bomb 132 and admit into the air bag 133 the vaporized gas produced by the burning of an explosive 131. Numeral 134 designates an occupant, e.g. the driver, 135 the seat in the vehicle.

The operation of the construction comprising in combination the above-described arrangements of FIGS. 2 and 3 is as follows. When the generating winding 8 generates a voltage upon occurrence of a collision so that this generated voltage reaches a value higher than the threshold voltage of the Zener diode 101, the thyristor 103 is fired by the generated voltage. The firing of the thyristor 103 causes the filament 104 to ignite the detonator 130 and therefore the air bag 133 begins to inflate. That is, the ignited detonator 130 opens the valve in the passage between the air bag 133 and the bomb 132 so that the vaporized gas produced by the buring of the explosive 131 contained in the bomb 132 in the form of a compressed medium is admitted into the air bag 133 to inflate it. The detection and indication of a fault can be made such as in a following manner. In FIG. 2 if the winding 8 or filament 104 is broken down, the output of the AND gate 107 becomes high level in the presence of the resistor 105 to operate the light emitting diode 111 and the meter 109 to operate for indicating the occurrence of the fault.

A second embodiment of the collision decision circuit for actuating an occupant protective device such as the above-described air bag 133 is shown in FIG. 4. In FIG. 4, those elements which act in the similar manner as the corresponding elements of the embodiment of FIG. 2 are designated by the identical reference numerals. Numeral 120 designates a bridge rectifier element, 121 an integrating resistor, 122 an integrating capacitor, 123 a leakage resistor. Numerals 106a and 106b designate fault detecting resistors whose divided voltage is selected not to exceed the threshold value of the Zener diode 101, and the resistance values of the resistors 106a, 106b, 121 and 123 are selected so that the divided voltage does not get higher than the threshold value of the Zener diode 101 when a fault occurs in the generating winding 8. Assuming now that the vehicle collides into something, the generating winding 8 generates a voltage and the integrating capacitor 122 begins to charge faster than its discharge through the leakage resistor 123. When the voltage across the terminals of the capacitor 122 becomes higher than the threshold voltage of the Zener diode 101, the air bag 133 is inflated to protect the occupant 134 against the impact in the similar manner as in the embodiment of FIG. 2. The embodiment of FIG. 4 basically differs from the embodiment of FIG. 2 in that a decision is made on the basis of the total value of change of flux that occurs in a unit time and therefore any misoperation of the device due to noises such as vibrations may be prevented.

Figure 5:
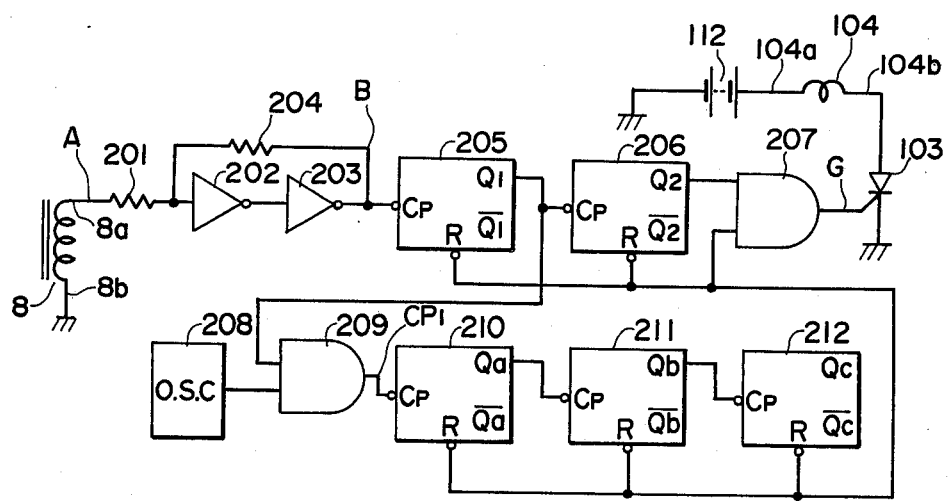
FIGS. 5 and 6 show respectively an electric wiring diagram of a third embodiment of the collision decision circuit used with the device of this invention and a waveform diagram useful for explaining the operation of this third embodiment.

FIG. 5 shows a third embodiment of the collision decision circuit in which the period T of AC voltage generated by the generating winding 8 is measured so that when the measured period T is shorter than a predetermined value, an air bag actuation signal is applied to the gate of the thyristor 103 (silicon controlled rectifier) to ignite the filament 104. In FIG. 5, numeral 201 designates an input resistor, 202 and 203 inverters for reshaping the input voltage waveform, 204 a feedback resistor, 205 and 206 frequency dividing flip-flops, 207 an AND element for final logical operation which may be composed of a NAND element having an inverter connected in series therewith. Numeral 208 designates an oscillator which oscillates with a fixed period and whose output is utilized in the form of clock pulses. Numeral 209 designates a gating AND element, and numerals 210, 211 and 212 designate frequency dividing flip-flops. For each flip-flop in FIG. 5, symbol $C_P$ designates a clock terminal, $Q_n$ and $\overline{Q}_n$ an output and its inverse output, R a reset terminal, whereby when both the clock terminal $C_P$ and the reset terminal R change from the high to low level, the output $Q_n$ is inverted and the flip-flop is reset.

Figure 6:
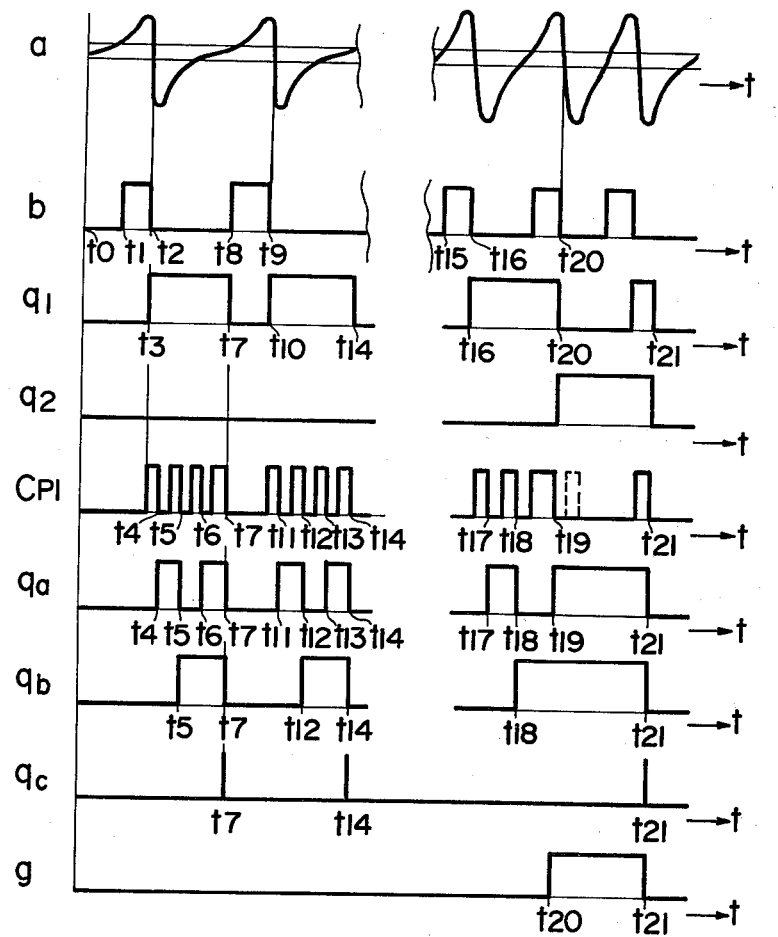

FIG. 6 is a waveform diagram showing the waveforms generated at various points in the circuit of FIG. 5 which are useful for explaining the operation thereof. In FIG. 6, the abscissas indicates the time base and FIG. 6a shows the voltage at a point A, FIG. 6b the voltage at a point B, FIG. 6q1 the voltage at an output $Q_1$, FIG. 6q2 the voltage at an output $Q_2$, FIG. $6C_{p1}$ the voltage at a clock terminal $C_{p1}$, FIG. 6qa the voltage at an output Qa, FIG. 6qb the voltage at an output Qb, FIG. 6qc the voltage at an output Qc and FIG. 6g the voltage at a point G. The waveform shown during the time period $t = t_0 - t_{14}$ indicates the case where no ignition commanding waveform for the filament 104 is applied to the gate of the thyristor 103, while the waveform shown during the time period $t = t_{15} - t_{21}$ indicates the case where an ignition command is produced. When the output $Q_1$ goes to the high level, a pulse is applied to the clock terminal $C_{p1}$ through the gating AND element 209, and at a time $t_7$ when the fourth clock pulse changes from the high to low level, the output voltage $qc$ at the output Qc goes to the high level to reset all of the flip-flops 205, 206, 211 and 212. In this case, the filament 104 is not ignited since the output of the generating winding 8 has a period longer than a predetermined value corresponding to the four clock pulses. In other words, the thyristor 103 is not fired. When the generating winding 8 generates a voltage having a period as the waveform shown during the time period $t = t_{15} - t_{21}$, the output voltage $q2$ at the output $Q_2$ goes to the high level at a time $t_{19}$ when the third clock pulse terminates. In this case, since the output voltage $qc$ at the inverse output $\overline{Q}c$ is still at the high level, the ignition commanding waveform is generated at the output of the AND element 207 and thus the thyristor 103 is fired to cause the filament 104 to ignite and actuate the air bag.

Figure 7:
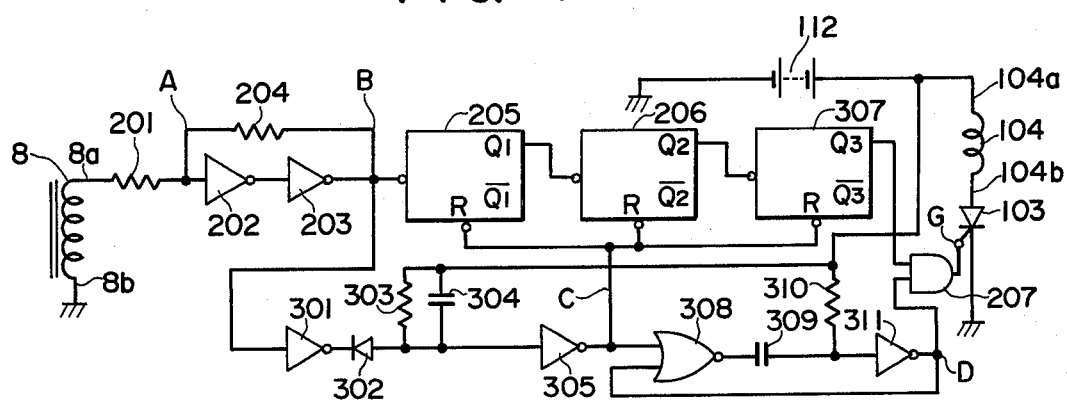
FIGS. 7 and 8 show respectively an electric wiring diagram of a fourth embodiment of the collision decision circuit used with the device of this invention and a waveform diagram useful for explaining the operation of this fourth embodiment.
Figure 8:
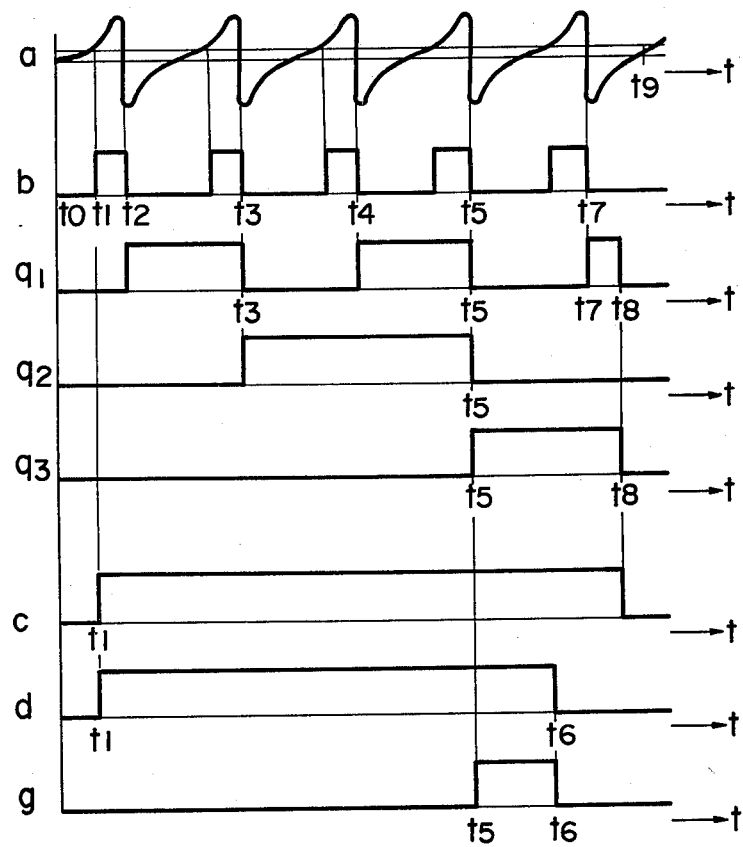

FIG. 7 shows a fourth embodiment of the collision decision circuit which consists of another form of the circuit for measuring the period of the output of the generating winding 8. FIG. 8 is a waveform diagram for explaining the operation of the fourth embodiment of the collision decision circuit. The circuit construction of this embodiment is identical with the embodiment of FIG. 5 up to the reshaping stage of the generated waveform which is followed by a three-stage frequency dividing circuit comprising three flip-flops 205, 206 and 307. The reshaping stage is also followed by a circuit designed to continuously produce a high level output so far as the generated waveform remains on and comprising an inverter 301, a diode 302, a resistor 303, a capacitor 304 and an inverter 305. There is further provided a one-shot multivibrator, i.e., a circuit for generating signals having a fixed time width which comprises a NOR element 308, a capacitor 309, a resistor 310 and an inverter 311. The final stage logical circuit is of the same construction as that of the embodiment shown in FIG. 5. When the generating winding 8 generates an AC voltage at a time $t = t_0$, the output voltage $q3$ at an output $Q_3$ of the third stage flip-flop 307 goes to the high level at a time $t = t_5$.

In this case, the output voltage $d$ at an output voltage D of the one-shot multivibrator remains at the high level until the time $t = t_1 - t_6$ and therefore the input voltage $g$ at the gate terminal of the thyristor 103 is at the high level during the time period $t = t_5 - t_6$. Consequently, the filament 104 is ignited by the thyristor 103 to actuate the air bag.

We claim:

1. A vehicle impact absorbing bumper device having a collision detector comprising: an impact absorbing bumper device having a cylinder attached to either a mounting stay on the body of a vehicle or a bumper located opposite to said mounting stay; a first piston attached to the other of said mounting stay and said bumper to be movable in said cylinder relative thereto; an impact absorbing medium in said first piston; a second piston one end of which is inserted in said first piston, the other end of which is fixed to either one of said mounting stay and said bumper which is secured to said cylinder, said impact absorbing medium being compressed by said second piston at the time of a collision for absorbing the impact of the collision; and a collision detector having voltage generating means provided in said cylinder and including a stator for providing a magnetic path and a generating winding for generating the voltage in accordance with the variation of the magnetic reluctance of said magnetic path, and a plurality of alternately arranged projections and notches made of a magnetic material and formed on said first piston to be movable in said generating means to change said magnetic reluctance.

2. The vehicle impact absorbing bumper device of claim 1 further comprising means for determining when the period of the voltage generated by said generating means is less than a predetermined time interval.

3. The vehicle impact absorbing bumper device of claim 2 wherein said time period detecting means comprises a clock pulse generator, means for gating said clock pulse generator in response to the occurrence of a voltage generated by said voltage generating means, and means for generating an actuating signal when a second voltage is generated by said voltage generating means before a preset number of pulses have been generated by said clock pulse generator.

4. A vehicle impact absorbing bumper device having an integrally formed collision detector comprising in combination: an impact absorbing bumper device having a cylinder attached to either a mounting stay on the body of the vehicle or a bumper located opposite to said mounting stay; a first piston attached to the other of said mounting stay and said bumper to be movable in said cylinder relative thereto; an impact absorbing medium positioned in said first piston to substantially fill the space therein; a second piston one end of which is inserted in said first piston, the other end of which is fixed to the mounting stay or bumper which is secured to said cylinder, said impact absorbing medium being compressed by said second piston at the time of a collision for absorbing the impact of the collision; and a collision detector including voltage generating means provided on said cylinder for generating a plurality of voltage pulses in response to relative movement of said first piston and said cylinder, said generating means including a stator for providing a magnetic path and a generating winding for generating the voltage in accordance with the variation of the magnetic reluctance of said magnetic path, and a plurality of alternately arranged projections and notches formed of a magnetic material and positioned on said first piston integral therewith to be movable with said piston to change the magnetic reluctance.

* * * * *